United States Patent [19]

Ito et al.

[11] 4,424,198

[45] Jan. 3, 1984

[54] PROCESS FOR PREPARING TRICHLOROSILANE AND SILICON TETRACHLORIDE FROM SILICON AND HYDROGEN CHLORIDE

[75] Inventors: Tadao Ito; Hidetaka Hori, both of Yokkaichi, Japan

[73] Assignee: Nippon Aerosil Co., Ltd., Tokyo, Japan

[21] Appl. No.: 404,751

[22] Filed: Aug. 3, 1982

[30] Foreign Application Priority Data

Aug. 17, 1981 [JP] Japan .................................. 56-127834

[51] Int. Cl.³ .......................... C01B 33/08; B01F 7/08
[52] U.S. Cl. .................................... 423/342; 422/135; 422/229
[58] Field of Search ............... 423/341, 342, DIG. 16; 422/229, 135

[56] References Cited

U.S. PATENT DOCUMENTS

3,148,035 9/1964 Enk et al. ............................ 423/342
3,395,990 8/1968 Ballestra ............................. 422/229

FOREIGN PATENT DOCUMENTS

504581 7/1954 Canada ................................ 423/342
48-29628 12/1973 Japan .................................. 422/135

Primary Examiner—Edward J. Meros
Assistant Examiner—Steven Capella
Attorney, Agent, or Firm—Oblon, Fisher, Spivak, McClelland & Maier

[57] ABSTRACT

An agitated bed operation in production of trichlorosilane and silicon tetrachloride from metallic silicon or metallic-silicon-containing solid materials and hydrogen chloride is disclosed. In the new agitated bed operation in a tower type reactor, defects and disadvantages of the conventional fixed bed operation and conventional fluidized bed operation are eliminated.

10 Claims, 1 Drawing Figure

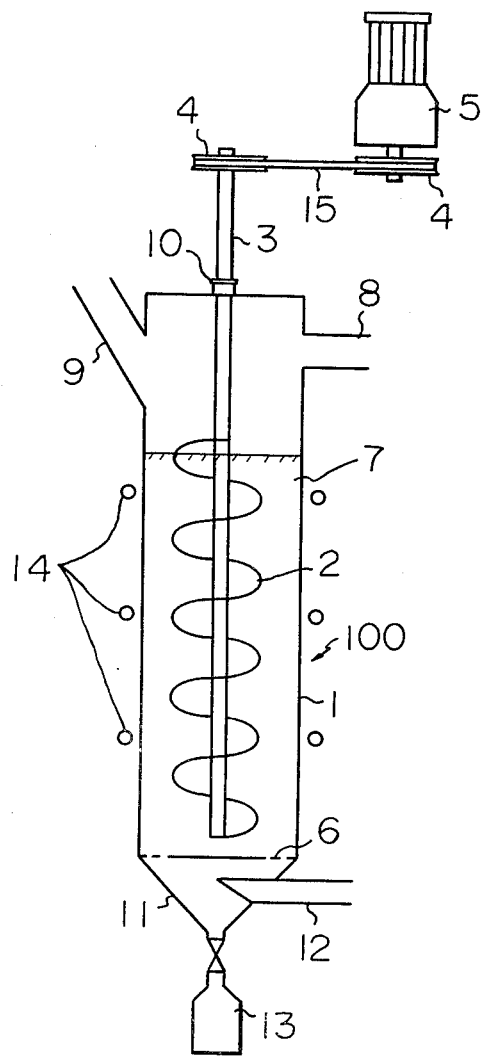

PROCESS FOR PREPARING TRICHLOROSILANE AND SILICON TETRACHLORIDE FROM SILICON AND HYDROGEN CHLORIDE

TECHNICAL FIELD OF THE INVENTION

This invention relates to a process for commercially producing trichlorosilane and silicon tetrachloride by reacting metallic silicon or a solid material containing metallic silicon with hydrogen chloride.

BACKGROUND OF THE INVENTION

As is well known, the reaction of silicon and hydrogen chloride proceeds rapidly, and is highly exothermic. And the higher the reaction temperature is, the lower the concentration of the trichlorosilane in the produced mixture of trichlorosilane and silicon tetrachloride is. The trichlorosilane concentration in the mixture is about 95% by weight at 260° C., about 70% by weight at 400° C., about 40% by weight at 600° C. and about 20% by weight at 800° C. in the equilibrated state. Both the trichlorosilane and the silicon tetrachloride produced by this reaction are industrially useful materials. For instance, trichlorosilane is useful as the starting material for semiconductor grade silicon and silicon tetrachloride is especially important as the starting material for vapor phase process silica.

Conventionally, when trichlorosilane is intended as the main product, the fluidized bed process, in which heat transfer is easy, is employed; and when silicon tetrachloride is intended as the main product, the fixed bed process, in which heat transfer is low and production cost is low. These processes are well known.

However, the fluidized bed process has some difficulties as outlined below.

1. There is a lower limit in the rate of hydrogen chloride supply.

If only hydrogen chloride is used as the fluidizing gas, the lower limit of the supply rate thereof corresponds to the minimum fluidizing velocity. At a velocity below said velocity, fluidization does not occur and the temperature rises locally, which may cause sintering of particles. If the flow velocity of hydrogen chloride is raised, in order to avoid the above-mentioned difficulty, hydrogen chloride is fed in an excess amount. To avoid this, it has been proposed to use silicon tetrachloride vapor and/or trichlorosilane vapor in combination with hydrogen chloride (Japanese Laying Open Patent Publication No. 6297/78) or to dilute the hydrogen chloride with an inert gas. However, it is obvious that the former method requires additional energy to vaporize the liquid materials and to condense silicon tetrachloride and/or trichlorosilane from the hydrogen-containing reaction product, the latter method requires additional energy to condense trichlorosilane and silicon tetrachloride from the mixture of the hydrogen-containing reaction product and the used inert gas, both methods obviously resulting in increase in energy consumption. When the fluidized bed operation must be continuously carried out under a given condition in average for a predetermined period of time, operation is impossible with a hydrogen chloride velocity below the velocity corresponding to the minimum fluidizing velocity. In order to overcome this difficulty, it is considered to conduct operation intermittently. However, it is obvious that such intermittent operation is economically disadvantageous.

2. Employable particle size range of the solid materials is limited.

As is well known, metallic silicon or metallic-silicon-containing solid materials are usually available in the lump state. In order to fluidize them, they must be finely pulverized and classified by size so as to collect the fraction of about 20–500 μm. It is obvious that to finely pulverize and classify lump materials requires much energy and, therefore, is economically disadvantageous. Incidentally, the reaction between metallic silicon or metallic-silicon-containing materials and hydrogen chloride proceeds rapidly, and, therefore, it is unnecessary to pulverize the solid materials for the purpose of increasing the gas-solid contact surface in order to promote the reaction. Pulverization of the solid materials is required only for fluidizing the materials in the case where the fluidized bed operation, in which heat transfer is quite easy, is employed.

3. Heat retention in the fluidized bed is limited.

The temperature at which the reaction in question is maintained is not lower than 260° C. In the fluidized bed, the quantity per unit volume of the solid materials retained therein is small, and, therefore the heat retention is small. Thus fluctuation in hydrogen chloride supply causes remarkable fluctuation in the temperature of the fluidized bed. In particular, if the hydrogen chloride supply decreases, or is temporarily stopped, the temperature drops so sharply that the reaction will no longer be maintained. In order to avoid this difficulty, an expensive temperature control device is required for the fluidized bed. On the contrary, the fixed bed operation has the following shortcomings:

1. Temperature of the fixed bed may rise abnormally.

In the fixed bed, heat transfer is difficult, and it is difficult, too, to uniformly distribute hydrogen chloride in the bed. Therefore, the temperature in the bed rises locally and causes sintering of solid materials. This phenomenon is remarkable in larger reactors. To avoid this difficulty, it has been proposed to feed hydrogen chloride in combination with vapor of silicon tetrachloride and/or trichlorosilane (Japanese Patent Publication No. 38518/77) or with an inert gas. However, both of these methods are disadvantageous since they incur greater energy consumption.

2. Solid surfaces gradually become non-reactive as the reaction proceeds.

As the reaction proceeds, the surface of the solid materials are contaminated with chlorides of impurities such as iron contained in the metallic silicon or metallic-silicon-containing materials, and will become non-reactive. This causes reduction in the reaction rate of hydrogen chloride. In order to overcome this difficulty, a deeper bed must be used to compensate for the reduction in the hydrogen chloride reaction rate.

Up to today, the fixed bed operation has been regarded as hopeless for production of trichlorosilane, and fluidized bed operation is exclusively depended upon and its improvement is attempted. In U.S. Pat. No. 2,449,821 of General Electric Company, for instance, a process and an apparatus for fluidized operation are disclosed. According to the invention of this patent, in the fluidized bed operation in which an alkyl halide and silicon powder are used, an agitator comprising a spiral ribbon supported around a vertical shaft spaced therefrom is provided in a cylindrical reaction tower, and it is rotated at the rate of 30–600 r.p.m. in order to stabilize the fluidized bed.

In the "Bulletin of the Research Institute of Mineral Dressing and Metallurgy, Tohoku University", 23 [I] 45–54 (1967), there is reported a process for producing trichlorosilane and silicon tetrachloride in which the same apparatus as disclosed in the above-mentioned U.S. patent is used, silicon powder smaller than 2 mm in the particle diameter is used, and the spiral ribbon agitator is rotated at the rate of 100–300 r.p.m.

With respect to the fixed bed process, there is described in "Chemical Engineering", December, 1957, p. 228, a process for producing silicon organohalide compounds in which finely divided metallic silicon powder is mixed with copper powder or copper oxide powder and charged in a batch system vertical reactor by means of an agitator and methyl chloride is fed into the reactor from the bottom.

In order to overcome the disadvantage of the above-mentioned fluidized bed operation and fixed bed operation, we focused on agitated bed operation and tried to develop an improved process for producing trichlorosilane and silicon tetrachloride from silicon and hydrogen chloride by said operation. We found the fact that slowly agitated bed operation was most advantageous both technically and economically. It has been conceivable to employ agitated bed operation for an exothermic reaction between a gaseous phase and a solid phase, and we do not know the fact that such an operation was carried out with a tower-type reactor.

And there is no precedent that the agitated bed operation was successfully employed in commercial scale production of trichlorosilane and silicon tetrachloride by the reaction of metallic silicon or metallic-silicon-containing material such as ferrosilicon in the lump state and hydrogen chloride. As the reasons therefor, it can be presumed that (1) the agitator and the reactor wall are severely abraded since metallic silicon or metallic-silicon-containing solid materials are very hard; and (2) it was not known what reactor geometry and shape of the agitator were suitable for achieving uniform temperature distribution throughout the bed to deal with the rapid and remarkably exothermic reaction.

DISCLOSURE OF THE INVENTION

According to this invention, in the process for producing trichlorosilane and silicon tetrachloride by reacting metallic silicon or metallic-silicon-containing materials and hydrogen chloride, an improved process comprising: using, as the starting materials, metallic silicon or metallic-silicon-containing materials in the lump from including powder; using, as the reactor, an upright cylindrical reactor provided with a screw conveyer, the diameter of the screw of which is at least one half ($\frac{1}{2}$) of the inside diameter of the reactor, and the space between the screw periphery and the inside wall of which is about 3–6 times the diameter of the largest lumps of the metallic silicon or metallic-silicon-containing materials to be used; introducing hydrogen chloride into the reactor, rotating said screw conveyer so as to convey the lumps and powder upward and regulating the rotation of said screw conveyer according to heat generation of the reaction system is provided.

In the process of this invention, the diameter of the screw of the reactor is preferably 3/5–$\frac{3}{4}$ of the inside diameter of the reactor and the space between the screw periphery and the inside wall of the reactor is 3–4 times the diameter of the largest lumps of the metallic silicon or metallic-silicon-containing materials to be used.

In the process of this invention, the term "metallic-silicon-containing solid material" means impure silicon-containing materials such as ferrosilicon which preferably contain at least 50% silicon.

The term "lump state" does not mean excluding powder. It encompasses powder inevitably incidental to lump materials. In the process of this invention, lump state materials having up to about 100 mm in diameter can be used, if a reactor of the corresponding size is used. As mentioned above, powder can be used. However, the advantage of the process of this invention cannot be exhibited using powder. Therefore, it is desirable to use materials in which the largest lumps have diameters of 10 mm or larger.

The advantage of the process of this invention resides in the fact that degree of contact of the gaseous and solid phases can be freely adjusted by controlling rotation of the screw conveyer. When the hydrogen chloride supply rate is low, the rotation speed is lowered so as to effect only horizontal displacement of the materials. Thus heat transfer in the reactor is diminished and lowering of the reactor temperature is prevented. As the hydrogen chloride supply is increased, rotation speed of the agitator is raised so as to increase the vertical movement of the materials, thus maintaining a desired temperature in the bed.

The agitator is rotated at a low speed, preferably at not higher than 30 r.p.m., although it varies according to the pitch of the screw. Increasing rotation speed higher than 30 r.p.m. gives no improvement in effect, only abrasion of the screw is accelerated. When the rotation speed is maintained in this range and the reaction temperature is adjusted to within the range of 260°–500° C., the screw can be made of mild steel. If a reaction temperature of 500°–800° C. is employed, a material which is heat-resistive and has resistance to hydrogen chloride, such as Inconel alloy must be used. If necessary, the outer edges of the screw may preferably be reinforced by forming weld bead of a hard alloy such as tungsten carbide thereon. With such reinforcement, the screw will be able to endure long continuous operation.

In the process of this invention, the solid materials in the reactor are agitated while being subjected to a kind of circulating movement. In this sense, the diameter of the screw conveyor must be at least approximately one half ($\frac{1}{2}$) of the inside diameter of the cylindrical reactor. If the screw conveyer is smaller than this, its agitation effect is insufficient, and it must be rotated at an excessively high speed.

The reason why the space between the inside wall of the reactor and the outer edge of the screw conveyer is defined as 3–6 times the diameter of the largest lumps is as follows. If the space is smaller than 3 times the diameter of the largest lumps, abrasion of the reactor wall is great, the life of the apparatus is shortened, and the maximum supply rate of hydrogen chloride must be held low. If this space is larger than 6 times the diameter of the largest lumps, heat transfer rate is low, which causes local elevation of temperature and makes it difficult to maintain uniform temperature distribution throughout the reactor. Within this range, a reactor made of mild steel will stand a prolonged continuous operation.

Hydrogen chloride is preferably fed into the reactor from the proximity of the reactor wall at the bottom thereof. The reason therefor is as follows. If hydrogen chloride is fed from the proximity of the reactor wall, it enters the reaction zone from the proximity of the reactor wall, which constitutes a cooling surface, and penetrates into the interior of the bed as it climbs in the reactor. Therefore, the reaction mainly takes place in the proximity of the reactor wall (cooled zone), so that heat is rapidly transferred and thus control of the bed temperature is easy. However, the hydrogen chloride inlet can be provided at the center of the bottom or at the top of the bed. That is, the position of the inlet is not limited in the working of the invention of this application. The hydrogen chloride inlet may be of the conventional structure and need not be of a particular type.

In the method of this invention, the lump size of metallic silicon or metallic-silicon-containing solid materials can be arbitrarily selected within the range of about 10 mm to about 100 mm as mentioned above. According to the size of the material selected, a suitable reaction apparatus can be designed within the scope of the dimensional relation specified above. Needness to say, the pitch of the screw should be larger than the diameter of the largest lumps. The minimum lump size, or the size distribution of the lumps need not be specified in particular. It will be satisfactory, if large lumps of commercially available metallic silicon or metallic-silicon-containing materials are crushed with an ordinary crusher such as a jaw crusher, the jaw faces of which are suitably adjusted in consideration of the size of the largest lumps to be obtained. The crushed product obtained will depend on the crushing characteristics of the crusher employed. Non-uniformity in the lump size of the crushed product does not give rise to any inconvenience in the agitated bed operation in accordance with this invention.

In the process of this invention, cooling of the agitated bed can be satisfactorily effected only through the reactor wall. No special heat exchange device such as that for the interior of a fluidized bed as disclosed in Japanese Laying-Open Patent Publication No. 127396/78 is required. According to this invention, a very simple cooling method such as air cooling, or formation of a water curtain on the outside surface of the reactor, etc. is employed in accordance with the rate of hydrogen chloride supply and the desired reaction temperature. Formation of a water curtain is especially convenient, since it allows any desired bed reaction temperature in the range of 260°–800° C. to be easily selected by varying the height of the upper edge of the water curtain. This makes it possible to vary the ratio of formed silicon tetrachloride to formed trichlorosiliane ($SiCl_4/SiHCl_3$) within the range of 80/20–4/96 by weight. This characteristic of the apparatus used for this invention is very advantageous in that the ratio and amount of trichlorosilane and silicon tetrachloride produced can freely varied. The agitated bed in accordance with this invention has a great water equivalent of heat in comparison with the conventional fluidized bed. Therefore, there is no drastic temperature change in the interior of the bed. So, the method of this invention is advantageous also in that the reactor does not require an expensive quick-response temperature control device for temperature control of the interior of the bed as required in fluidized bed operation. Further advantages of the process of this invention are:

1. As fresh surfaces of metallic silicon or metallic-silicon-containing materials are constantly exposed because of the abrasion due to agitation, the rate of the reaction with hydrogen chloride does not decrease.

2. It has been found that fine particles of the reaction residue (iron, for instance) in the reaction of metallic-silicon-containing materials (ferrosilicon, for instance) are settled at the bottom of the reactor by virtue of the slow rotation of the screw. The reaction residue and the unreacted materials can easily be separated. The fine particles of the reaction residue can easily be taken out of the reactor using an ordinary perforated plate, and thus they do not accumulate in the reactor.

As described above, almost all of the defects of the conventional fluidized bed process and the conventional fixed bed process for production of trichlorosilane and silicon tetrachloride are eliminated in the process of this invention, and it is quite obvious that the low-speed-agitation agitated bed process of this invention is advantageous.

The height and diameter of the reaction bed of the low-speed-agitation agitated bed in accordance with this invention are determined by the maximum rate of hydrogen chloride supply. However, it is economical to limit the maximum bed height to 3 m per reactor, and the maximum diameter to 1 m.

It is effective for making the temperature distribution in the reaction bed uniform to add Raschig rings or rods of an inert metal to the reaction bed.

Now the invention is described specifically with reference to the attached drawing.

BRIEF DESCRIPTION OF THE DRAWING

The attached drawing is a schematic cross section of an embodiment of a low-speed-agitation agitated bed in accordance with this invention.

DETAILED DESCRIPTION OF THE EMBODIMENT OF THE INVENTION

In the attached drawing, a reactor 100 is a closed vessel of mild steel, 400 mm in diameter and 1,600 mm in height. At the center thereof is provided an iron screw 2, 220 mm in diameter and 200 mm in pitch. The length of the screw is 1,000 mm. The screw is connected to the rotation reducer of a motor 5 through a shaft 3, pulleys 4, 4' and a belt 15. The rotation is adjustable within the range of 0–60 r.p.m. Inside the reactor wall 1, a bed 7 of lumps and particles (1–30 mm in size) of ferrosilicon (silicon content 90%) is formed from the perforated plate 6 upward to the height of 1,000 mm. At the top of the reactor are provided an outlet 8 for the produced gases, a supply duct 9 for ferrosilicon and a gas tight seal 10 for the shaft. At the conical bottom 11 are provided hydrogen chloride supply duct 12, and a receptacle 13 for the reaction residue. A valve is provided between the reactor and the receptacle and the receptacle is easily removable. In order to measure temperatures inside the bed, four thermocouples are inserted in the hollow shaft of the screw at 300 mm intervals, the lowest one being 300 mm from the bottom. For the purpose of cooling the bed, three annular water spray tubes 14 are provided around the reactor at intervals of 300 mm the lowest one being 300 mm from the perforated plate. This apparatus can be easily designed and constructed by those who have ordinary knowledge of chemical engineering.

Hydrogen chloride was supplied into the reactor when the feed rate of HCl was 120 N m$^3$/hr. and the maximum temperature at the core of the reactor was controlled to be 300° C., the conversion of HCl was 95% or more. At this time, the content of trichlorosilane in the produced trichlorosilane-silicon tetrachloride mixture was 95% by weight. When the feed rate of HCl was 140 N m$^3$/hr. and the maximum temperature at the core of the reactor was controlled to be 500° C., the conversion of HCl was almost the same as above, but the trichlorosilane content in the produced mixture was 50% by weight. The maximum reactor core temperature could be adjusted between 260°-500° C. as desired by selectively employing air cooling and water cooling. Rotation of the screw was 20 r.p.m. for the above mentioned maximum supply of hydrogen chloride.

This reactor was operated continuously for 10 days. Fine solid residue was collected in the receptacle 13 through the perforated plate 6, and decrease in conversion of hydrogen chloride due to accumulation of fine solid residue in the bed did not occur even after the distribution of particle size in the bed reached equilibrium.

The results of the operations in which the same apparatus and the same silicon material were used under the varied conditions of hydrogen chloride supply, screw rotation and cooling, are shown in the following table.

| Rate of hydrogen chloride supply (Nm$^3$/hr) | Rotation of screw (r.p.m.) | Maximum temperature in the reactor (°C.) | Method of cooling | Conversion of hydrogen chloride (%) | Ratio of trichlorosilane in the product (wt. %) |
|---|---|---|---|---|---|
| 10 | 10 | 300 | Air | 100 | 95 |
| 10 | 5 | 340 | Air | 100 | 90 |
| 50 | 20 | 340 | Air (upper half) Water (lower half) | 100 | 90 |
| 50 | 20 | 300 | Water | 100 | 95 |
| 120 | 20 | 300 | Water | 95 | 95 |
| 140 | 20 | 500 | Air (upper half) Water (lower half) | 95 | 50 |

INDUSTRIAL APPLICABILITY

The process of this invention eliminates most of the disadvantages of conventional fixed bed operation and conventional fluidized bed operation in the production of trichlorosilane and silicon tetrachloride from metallic silicon and hydrogen chloride, and makes the production of said products more economical.

We claim:

1. In a process for producing trichlorosilane and silicon tetrachloride by reacting metallic silicon or metallic-silicon-containing materials and hydrogen chloride, the improvement comprising:
    providing, as the reactive silicon-containing starting material, metallic silicon or metallic-silicon-containing materials in the lump from ranging downward in particle size to silicon powder;
    upwardly conveying said silicon-containing starting material in an upright cylindrical reactor provided with a screw conveyor, the diameter of which is at least one-half of the inside diameter of the reactor with the space between the screw periphery and the inside wall of the reactor being about 3-6 times the diameter of the largest lumps of metallic silicon or metallic-silicon-containing materials being conveyed through the reactor;
    introducing hydrogen chloride into the reactor; and
    rotating said screw conveyor so as to transport the silicon lumps and powder upward in the reactor, the rate of rotation of said conveyor being controlled such that the rate of rotation is increased as heat generation increases and is decreased as the rate of heat generation decreases.

2. The process of claim 1, wherein said reactor is externally cooled.

3. The process of claim 2, wherein said cooling is effected by sprinkling water onto the exterior surfaces of the reactor.

4. The process of claim 1, 2 or 3, wherein the reactor is provided with a receptacle for receiving powder of unreacted impurities at its base.

5. The process of claim 1, 2 or 3, wherein the diameter of the screw of the reactor is 3/5-¾ of the inside diameter of the reactor and the space between the screw periphery and the inside wall on the reactor is 3-4 times the diameter of the largest lumps of the metallic silicon or metallic-silicon-containing starting material.

6. The process of claim 4, wherein the diameter of the screw of the reactor is 3/5-¾ of the inside diameter of the reactor and the space between the screw periphery and the inside wall of the reactor is 3-4 times the diameter of the largest lumps of the metallic silicon or metallic-silicon-containing starting material.

7. The process of claim 1, wherein the temperature of said reaction ranges between 260°-800° C.

8. The process of claim 1, wherein the rate of rotation of said screw conveyor does not exceed 30 rpm.

9. The process of claim 1, wherein the largest size of the lumps of silicon-containing material is about 100 mm.

10. The process of claim 1, wherein the ratio of silicon tetrachloride to trichlorosilane product formed ranges from 80/20-4/96 by weight.

* * * * *